United States Patent
Beers et al.

(10) Patent No.: US 10,487,853 B2
(45) Date of Patent: Nov. 26, 2019

(54) ALIGNMENT TOOL FOR INSTALLING A DIFFUSER IN AN AIR CYCLE MACHINE

(71) Applicant: Hamilton Sundstrand Corporation, Windsor Locks, CT (US)

(72) Inventors: Craig M. Beers, Wethersfield, CT (US); Clarence J. Wytas, Jr., Stafford Springs, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 527 days.

(21) Appl. No.: 15/293,792

(22) Filed: Oct. 14, 2016

(65) Prior Publication Data

US 2017/0030376 A1    Feb. 2, 2017

Related U.S. Application Data

(62) Division of application No. 14/498,082, filed on Sep. 26, 2014, now Pat. No. 9,469,406.

(51) Int. Cl.
| | |
|---|---|
| *G01B 5/24* | (2006.01) |
| *F04D 29/62* | (2006.01) |
| *G01B 5/25* | (2006.01) |
| *B64D 13/00* | (2006.01) |
| *F04D 25/02* | (2006.01) |
| *F04D 29/44* | (2006.01) |
| *B64D 13/06* | (2006.01) |

(Continued)

(52) U.S. Cl.
CPC ............ *F04D 29/624* (2013.01); *B64D 13/00* (2013.01); *B64D 13/06* (2013.01); *F04D 25/02* (2013.01); *F04D 25/024* (2013.01); *F04D 29/444* (2013.01); *G01B 5/24* (2013.01); *G01B 5/25* (2013.01); *F04D 29/2222* (2013.01); *F04D 29/642* (2013.01); *Y02T 50/44* (2013.01)

(58) Field of Classification Search
CPC ..... F04D 29/2222; F04D 29/642; G01B 5/24; G01B 5/25
USPC ............. 33/645, 412, 529, 533, 613, 501.45
See application file for complete search history.

(56) References Cited

U.S. PATENT DOCUMENTS

| | | | |
|---|---|---|---|
| 4,129,950 A | * | 12/1978 | Weinhaus ................ G01B 3/30 33/203.19 |
| 4,854,126 A | | 8/1989 | Chevis et al. |

(Continued)

FOREIGN PATENT DOCUMENTS

| | | |
|---|---|---|
| CN | 101498319 A | 8/2009 |
| CN | 102369356 A | 3/2012 |

(Continued)

OTHER PUBLICATIONS

Chinese First Office Action for Chinese Patent Application No. 201510391631.5, dated Jun. 21, 2018, 13 pages.

*Primary Examiner* — Christopher W Fulton
(74) *Attorney, Agent, or Firm* — Kinney & Lange, P.A.

(57) ABSTRACT

A method of installing a diffuser in an air cycle machine includes placing a first housing on a shaft, placing a seal plate on the shaft, and placing a diffuser on the shaft. Next, the diffuser and the seal plate are aligned with an alignment tool. The alignment tool has a first annular surface to align with a radially outer surface of the seal plate and a second annular surface to align with an annular flange on the diffuser. Finally, the diffuser is fastened to the seal plate and the alignment tool is removed from the diffuser and the seal plate.

16 Claims, 8 Drawing Sheets

(51) Int. Cl.
*F04D 29/22* (2006.01)
*F04D 29/64* (2006.01)

(56) References Cited

U.S. PATENT DOCUMENTS

| | | | | |
|---|---|---|---|---|
| 5,042,161 A | * | 8/1991 | Hodge | A61B 5/1076 |
| | | | | 33/501.45 |
| 5,142,762 A | | 9/1992 | Dziorny et al. | |
| 5,253,427 A | * | 10/1993 | Bartlett | G01B 3/30 |
| | | | | 33/501.08 |
| 5,921,683 A | | 7/1999 | Merritt et al. | |
| 6,151,793 A | * | 11/2000 | Carlen | G01B 5/252 |
| | | | | 33/412 |
| 8,419,283 B2 | | 4/2013 | McAuliffe et al. | |
| 8,475,114 B2 | | 7/2013 | Rosen et al. | |
| 8,523,530 B2 | | 9/2013 | Merritt et al. | |
| 8,529,210 B2 | | 9/2013 | Merritt et al. | |
| 8,533,968 B2 | * | 9/2013 | Anapliotis | A61F 2/30721 |
| | | | | 33/1 BB |
| 2003/0121166 A1 | * | 7/2003 | Lin | G11B 17/028 |
| | | | | 33/645 |
| 2006/0032070 A1 | * | 2/2006 | Biggs | B82Y 10/00 |
| | | | | 33/645 |
| 2009/0265947 A1 | * | 10/2009 | Sanders | D21F 5/02 |
| | | | | 33/517 |
| 2012/0020779 A1 | | 1/2012 | Holtman et al. | |
| 2012/0156027 A1 | | 6/2012 | Merritt et al. | |
| 2013/0052019 A1 | | 2/2013 | Ions et al. | |
| 2013/0078090 A1 | | 3/2013 | Beers et al. | |
| 2013/0219733 A1 | * | 8/2013 | Smith | F01D 25/285 |
| | | | | 33/645 |
| 2013/0344790 A1 | | 12/2013 | Army et al. | |
| 2014/0030099 A1 | | 1/2014 | Hayman et al. | |
| 2014/0199167 A1 | | 7/2014 | Beers et al. | |
| 2015/0226534 A1 | * | 8/2015 | Rodriguez | G01B 3/34 |
| | | | | 33/501.45 |
| 2015/0275910 A1 | * | 10/2015 | Beers | F16C 33/74 |
| | | | | 384/130 |
| 2016/0090869 A1 | * | 3/2016 | Beers | B64D 13/00 |
| | | | | 29/889.22 |

FOREIGN PATENT DOCUMENTS

CN 102536911 A 7/2012
JP H084695 A 1/1996

* cited by examiner

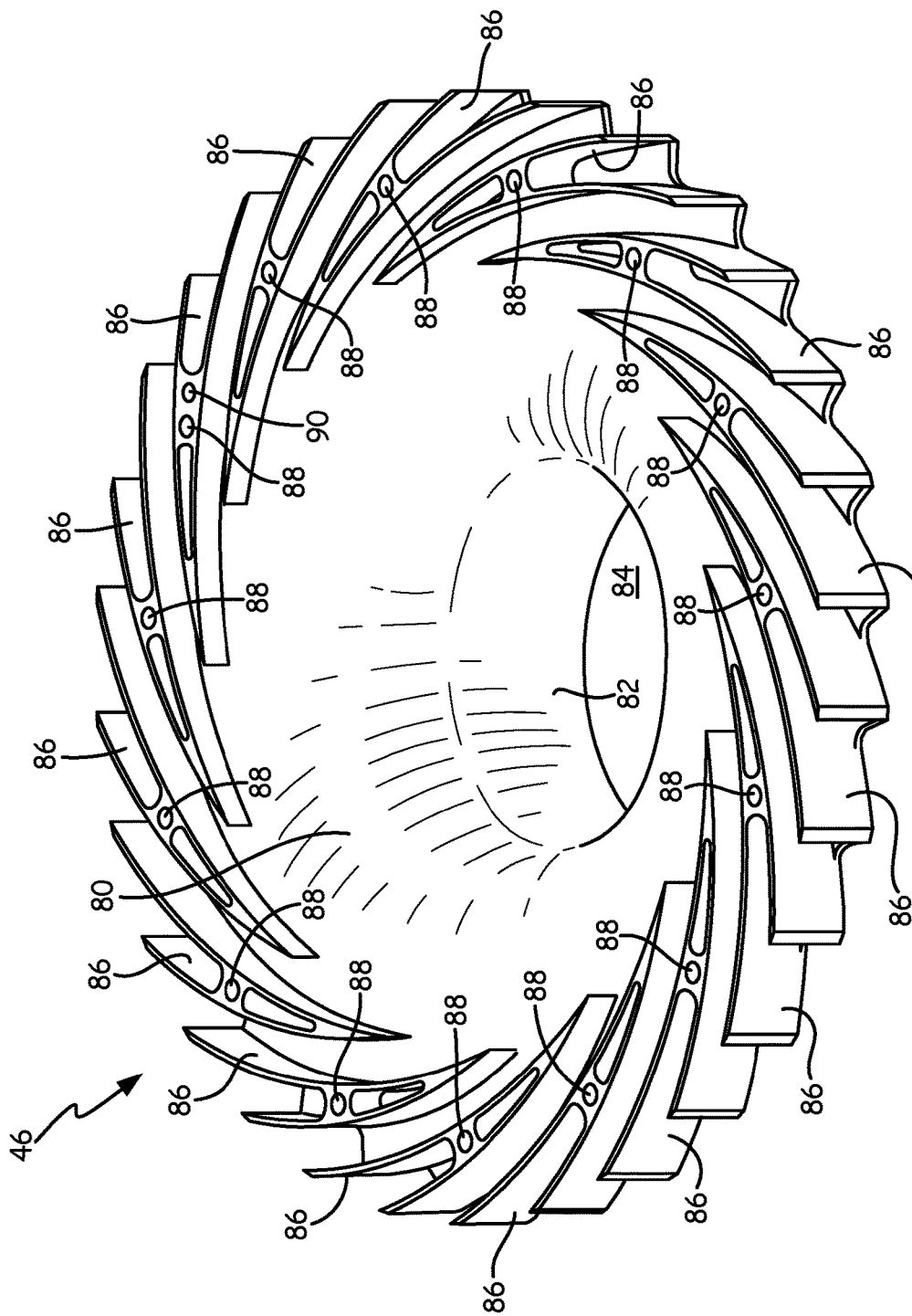

ALIGNMENT TOOL FOR INSTALLING A DIFFUSER IN AN AIR CYCLE MACHINE

CROSS-REFERENCE TO RELATED APPLICATION(S)

This application claims priority to U.S. application Ser. No. 14/498,082, filed on Sep. 26, 2014, and entitled "Method of Installing a Diffuser in an Air Cycle Machine," issued on Oct. 18, 2016 as U.S. Pat. No. 9,469,406, the disclosure of which is incorporated by reference in its entirety.

BACKGROUND

The present disclosure relates to aircraft environmental control systems. More specifically, the present disclosure relates to a method of installing a diffuser in an air cycle machine.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the initial ambient air temperature is very low. Thus, under most conditions, heat must be removed from air by the air cycle machine before the air is delivered to the aircraft cabin.

Air cycle machines typically include rotating parts connected to a rotating shaft that extends through static parts of the air cycle machine. Each end of the rotating shaft is supported with a journal bearing to mount the rotating shaft in the static parts of the air cycle machine. During assembly of the air cycle machine, the static parts need to be closely aligned with one another so that the journal bearings on either end of the air cycle machine can also be closely aligned. It is important to closely align the journal bearings so the rotating shaft rotates about an axis through the center of the rotating shaft. Any misalignment between the journal bearings can cause rubbing and wear between the rotating parts and the static parts.

To closely align the static parts, two processes can be undertaken. First, prior to assembly of the entire air cycle machine, the static parts can be pinned together. The pinning process includes assembling and aligning the static parts, drilling a hole though adjacent static parts, and placing a pin in the drilled holes. The static parts can then be disassembled and reassembled with all of the air cycle machine parts. The pins act as guides to ensure the static parts are properly aligned. The pinning process adds additional complexity to the assembly process, as it creates more components in the air cycle machine. The second option to ensure the parts are closely aligned is to precision manufacture the static parts so that they can be perfectly aligned during assembly of the air cycle machine. Precision manufacturing can be costly and time consuming.

SUMMARY

A method of installing a diffuser in an air cycle machine includes placing a first housing on a shaft, placing a seal plate on the shaft, and placing a diffuser on the shaft. Next, the diffuser and the seal plate are aligned with an alignment tool. The alignment tool has a first annular surface to align with a radially outer surface of the seal plate and a second annular surface to align with an annular flange on the diffuser. Finally, the diffuser is fastened to the seal plate and the alignment tool is removed from the diffuser and the seal plate.

An alignment tool that can be used to install a diffuser in an air cycle machine includes a body with a cylindrical portion and an end portion. The alignment tool further includes a first surface on a radially inner face of the cylindrical portion positioned axially away from the end portion, a second surface on the radially inner face of the cylindrical portion positioned adjacent to the end portion, and a third surface on a radially inner edge of the end portion.

BRIEF DESCRIPTION OF THE DRAWINGS

FIG. 2A is a perspective view of a diffuser.

DETAILED DESCRIPTION

Figure 1A:
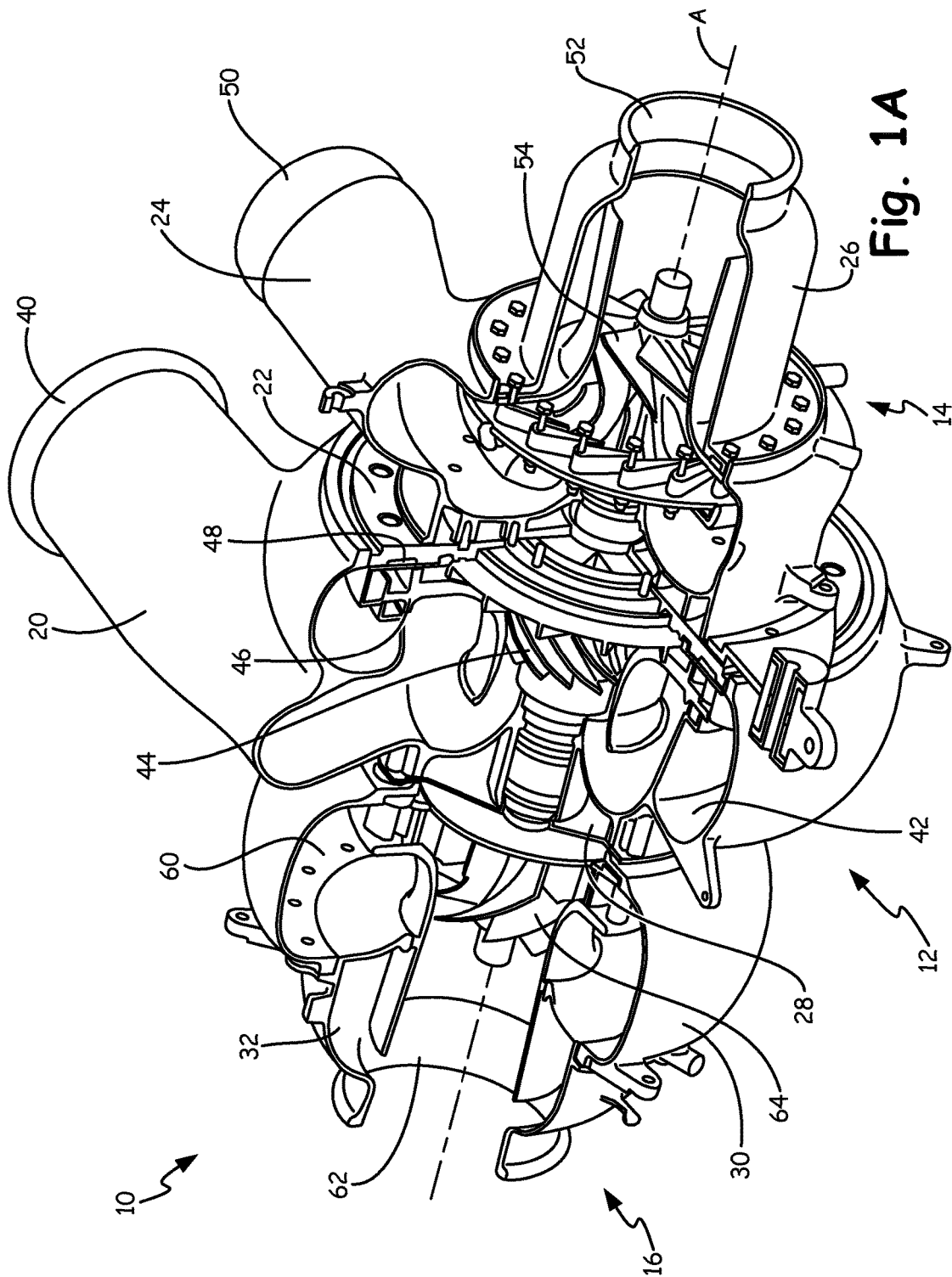
FIG. 1A is a partial cut-away perspective view of an air cycle machine.
Figure 1B:
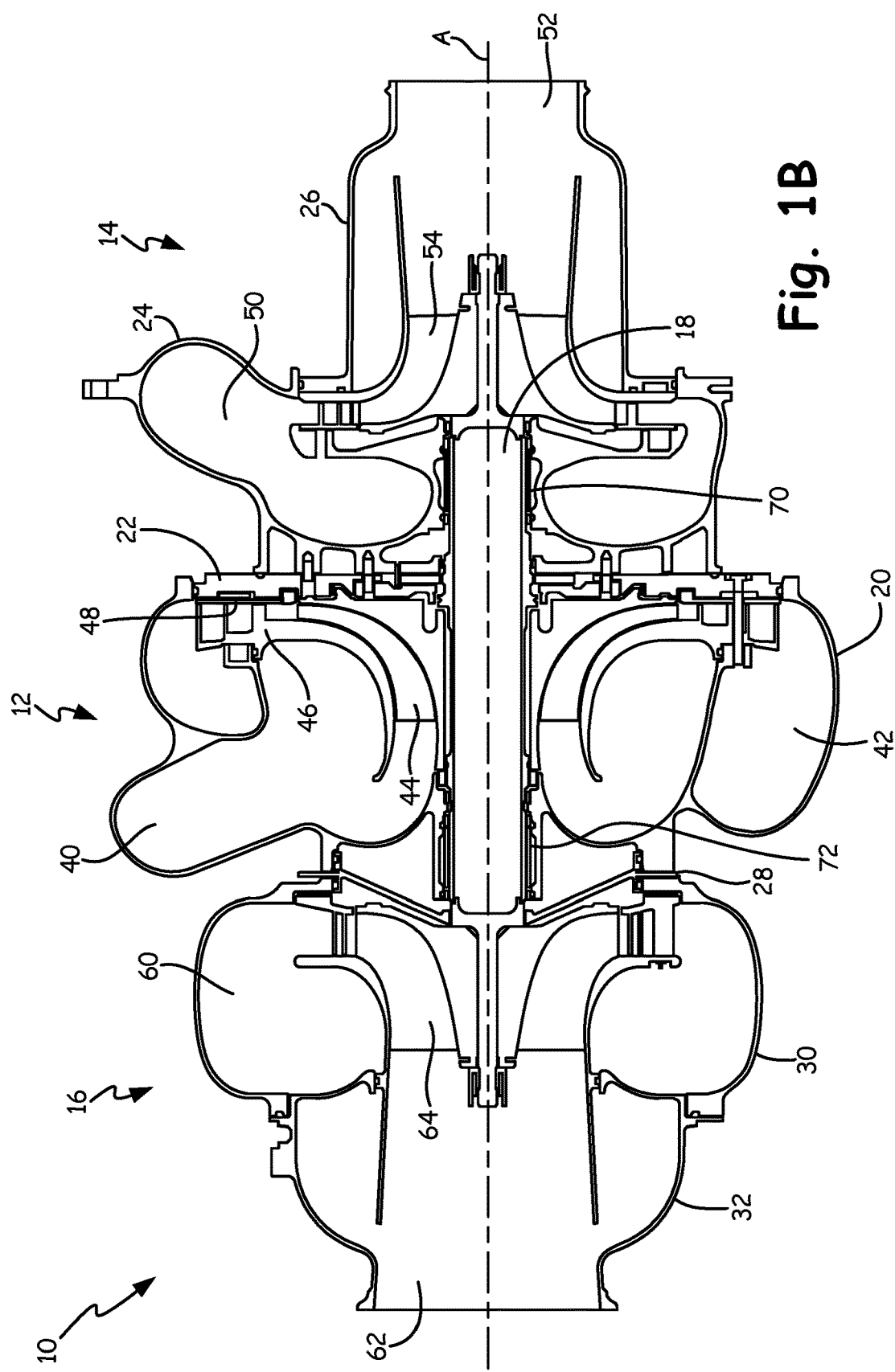
FIG. 1B is a cross-sectional view of the air cycle machine seen in FIG. 1A.

FIG. 1A is a partial cut-away perspective view of air cycle machine 10. FIG. 1B is a cross-sectional view of air cycle machine 10 seen in FIG. 1A. Air cycle machine 10 includes compressor section 12, first turbine section 14, second turbine section 16, shaft 18, compressor housing 20, first seal plate 22, first turbine inlet housing 24, first turbine outlet housing 26, second seal plate 28, second turbine inlet housing 30, and second turbine outlet housing 32. Also shown in FIGS. 1A-1B is axis A.

Compressor section 12, first turbine section 14, and second turbine section 16 are all mounted on shaft 18. Shaft 18 is rotatable about axis A. Compressor housing 20 forms a central housing portion of air cycle machine 10. Seal plate 22 is connected to a first end of compressor housing 20. First turbine inlet housing 24 is connected to seal plate 22 and first turbine outlet housing 26 is connected to first turbine inlet housing 24. Seal plate 28 is connected to a second end of compressor housing 20. Second turbine inlet housing 30 is connected to seal plate 28 and second turbine outlet housing 32 is connected to second turbine inlet housing 30. Compressor housing 20, first turbine inlet housing 24, first turbine outlet housing 26, second turbine inlet housing 30, and second turbine outlet housing 32 together form an overall housing for air cycle machine 10. Compressor housing 20 houses compressor section 12, first turbine inlet housing 24 and first turbine outlet housing 26 together house first turbine section 14, and second turbine inlet housing 30 and second turbine outlet housing 32 together house second turbine section 16.

Compressor section 12 includes compressor housing 20, which includes compressor inlet 40 and compressor outlet 42, and which houses compressor rotor 44, diffuser 46, and backing plate 48. Air is directed into compressor inlet 40 and is routed through a duct to compressor outlet 42. Compressor rotor 44 and diffuser 46 are positioned in the duct. Compressor rotor 44 is mounted to be rotatable with shaft 18 to compress the air flowing through compressor section 12. Diffuser 46 is a static structure through which the compressed air can flow after it has been compressed with compressor rotor 44. Diffuser 46 is positioned over and around compressor rotor 44. Backing plate 48 is positioned adjacent to vanes on diffuser 46 and contains the air moving through the vanes on diffuser 46. Air exiting diffuser 46 can exit compressor section 12 through compressor outlet 42.

First turbine section 14 includes first turbine inlet housing 24, first turbine outlet housing 26, first turbine inlet 50, first turbine outlet 52, and first turbine rotor 54. First turbine inlet housing 24 includes first turbine inlet 50 and first turbine outlet housing 26 includes first turbine outlet 52. First turbine rotor 54 extends between first turbine inlet housing 24 and first turbine outlet housing 26. Air is directed into first turbine inlet 50 and is routed through a duct formed between first turbine inlet housing 24 and first turbine outlet housing 26 to first turbine outlet 52. First turbine rotor 54 is positioned in first turbine section 14 and is mounted to be rotatable with shaft 18. First turbine rotor 54 will extract energy from the air passing through first turbine section 14 to drive rotation of shaft 18.

Second turbine section 16 includes second turbine inlet housing 30, second turbine outlet housing 32, second turbine inlet 60, second turbine outlet 62, and second turbine rotor 64. Second turbine inlet housing 30 includes second turbine inlet 60 and second turbine outlet housing 32 includes second turbine outlet 62. Second turbine rotor 64 extends between second turbine inlet housing 30 and second turbine outlet housing 32. Air is directed into second turbine inlet 60 and is routed through a duct formed between second turbine inlet housing 30 and second turbine outlet housing 32 to second turbine outlet 62. Second turbine rotor 64 is positioned in second turbine section 16 and is mounted to be rotatable with shaft 18. Second turbine rotor 64 will extract energy from the air passing through second turbine section 16 to drive rotation of shaft 18.

Air cycle machine 10 further includes first journal bearing 70 and second journal bearing 72. First journal bearing 70 is positioned around a first end of shaft 18 in first turbine inlet housing 24. Second journal bearing 72 is positioned around a second end of shaft 18 in compressor housing 20. First journal bearing 70 and second journal bearing 72 support shaft 18 as shaft 18 rotates in air cycle machine 10. When air cycle machine 10 is assembled, first journal bearing 70 and second journal bearing 72 are aligned so that shaft 18 is rotatable about axis A.

Figure 2B:
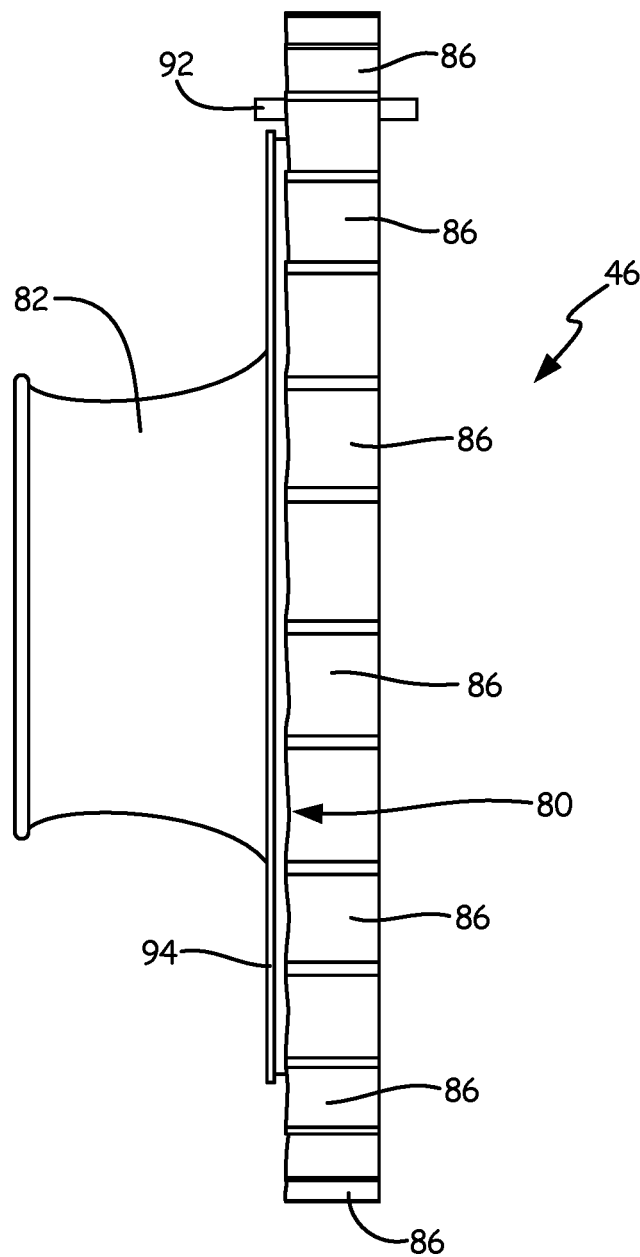
FIG. 2B is a side view of the diffuser.

FIG. 2A is a perspective view of diffuser 46. FIG. 2B is a side view of diffuser 46. Diffuser 46 includes disk portion 80, hub portion 82, bore 84, vanes 86, fastener apertures 88, pin aperture 90, timing pin 92, and mounting flange 94.

Diffuser 46 includes disk portion 80 and hub portion 82. Disk portion 80 is a flat portion of diffuser 46 that extends radially outward from hub portion 82. Hub portion 82 has bore 84 that extends through a center of hub portion 82. Bore 84 of diffuser 80 can be positioned over a shaft to mount diffuser 46 in air cycle machine 10.

Vanes 86 are mounted on disk portion 80 of diffuser 46. Each vane 86 is positioned a distance away from an adjacent vane 86 on disk portion 80 so that air can flow between vanes 86. Fastener apertures 88 extend through vanes 86 and disk portion 80 of diffuser 46. One fastener aperture 88 extends through each vane 86. Fastener apertures 88 are openings in which fasteners can be positioned to mount diffuser 46 in air cycle machine 10.

Pin aperture 90 extends through one vane 86 and disk portion 80 of diffuser 46 adjacent to one fastener aperture 88, as seen in FIG. 2A. Pin aperture 90 is an opening in which timing pin 92 can be positioned, as seen in FIG. 2B. Timing pin 92 is positioned in pin aperture 90 and extends in an axially forward and an axially backward direction relative to diffuser 46. Timing pin 92 is used to orient diffuser 46 as it is installed in air cycle machine 10. Diffuser 46 also includes mounting flange 94 on a radially outer surface of hub portion 82. Mounting flange 94 is positioned adjacent to disk portion 80 on hub portion 82. Mounting flange 94 is used to mount diffuser 46 in air cycle machine 10.

Figure 3A:
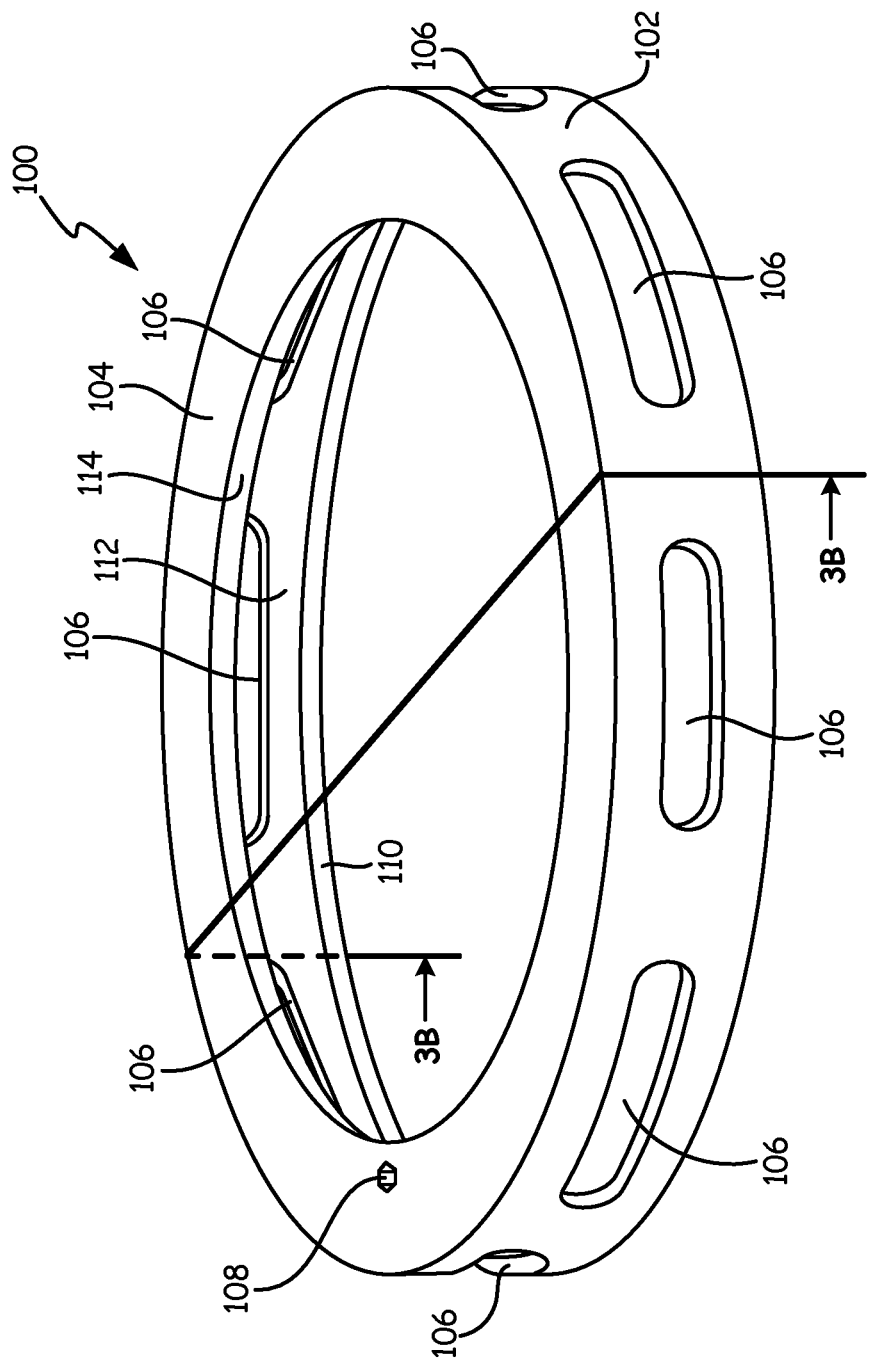
FIG. 3A is a perspective view of an alignment tool.
Figure 3B:
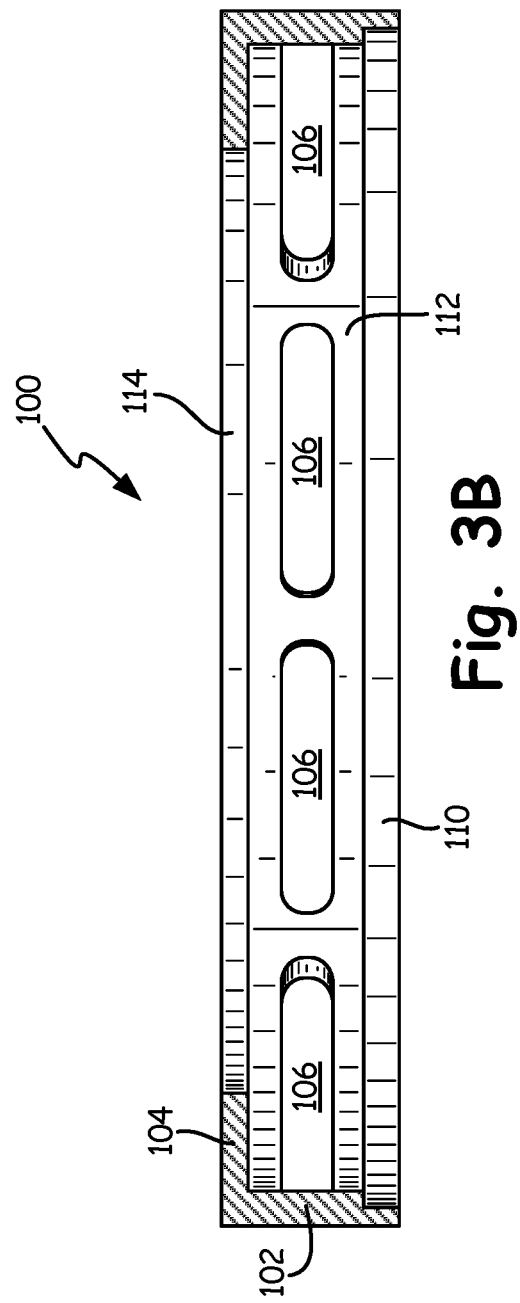
FIG. 3B is a cross-sectional view of the alignment tool taken along line 3B-3B of FIG. 3A.

FIG. 3A is a perspective view of alignment tool 100. FIG. 3B is a cross-sectional view of alignment tool 100 taken along line 3B-3B of FIG. 3A. Alignment tool 100 includes cylindrical portion 102, end portion 104, openings 106, pin aperture 108, first surface 110, second surface 112, and third surface 114.

Alignment tool 100 is used to align diffuser 46 in air cycle machine 10 when air cycle machine 10 is being assembled. Alignment tool 100 includes cylindrical portion 102 and end portion 104. Cylindrical portion 102 is an annular portion that extends axially away from end portion 104. End portion 104 is a flat portion with an opening in the center. Alignment tool 100 further includes openings 106 in cylindrical portion 102. Openings 106 are included to reduce the weight of alignment tool 100 to make alignment tool 100 easier to handle. Alignment tool 100 further includes pin aperture 108 on end portion 104. Pin aperture 108 is sized to receive timing pin 92 of diffuser 46.

Alignment tool 100 includes first surface 110, second surface 112, and third surface 114. First surface 110 is a radially inner surface of cylindrical portion 102 with an annular shape. Second surface 112 is also a radially inner surface of cylindrical portion 102 with an annular shape. Second surface 112 is positioned adjacent to end portion 104 and first surface 110 is positioned axially away from end portion 104. First surface 110 and second surface 112 have different diameters, with first surface 110 having a larger diameter than second surface 112. This creates a step between first surface 110 and second surface 112. When alignment tool 100 is placed over diffuser 46, first surface 110 surrounds the radially outer surface of seal plate 22 and the step can rest against a face of seal plate 22. Third surface 114 is positioned on a radially inner edge of end portion 104 and has an annular shape. Third surface 114 has a smaller diameter than both first surface 110 and second surface 112.

Figure 4A:
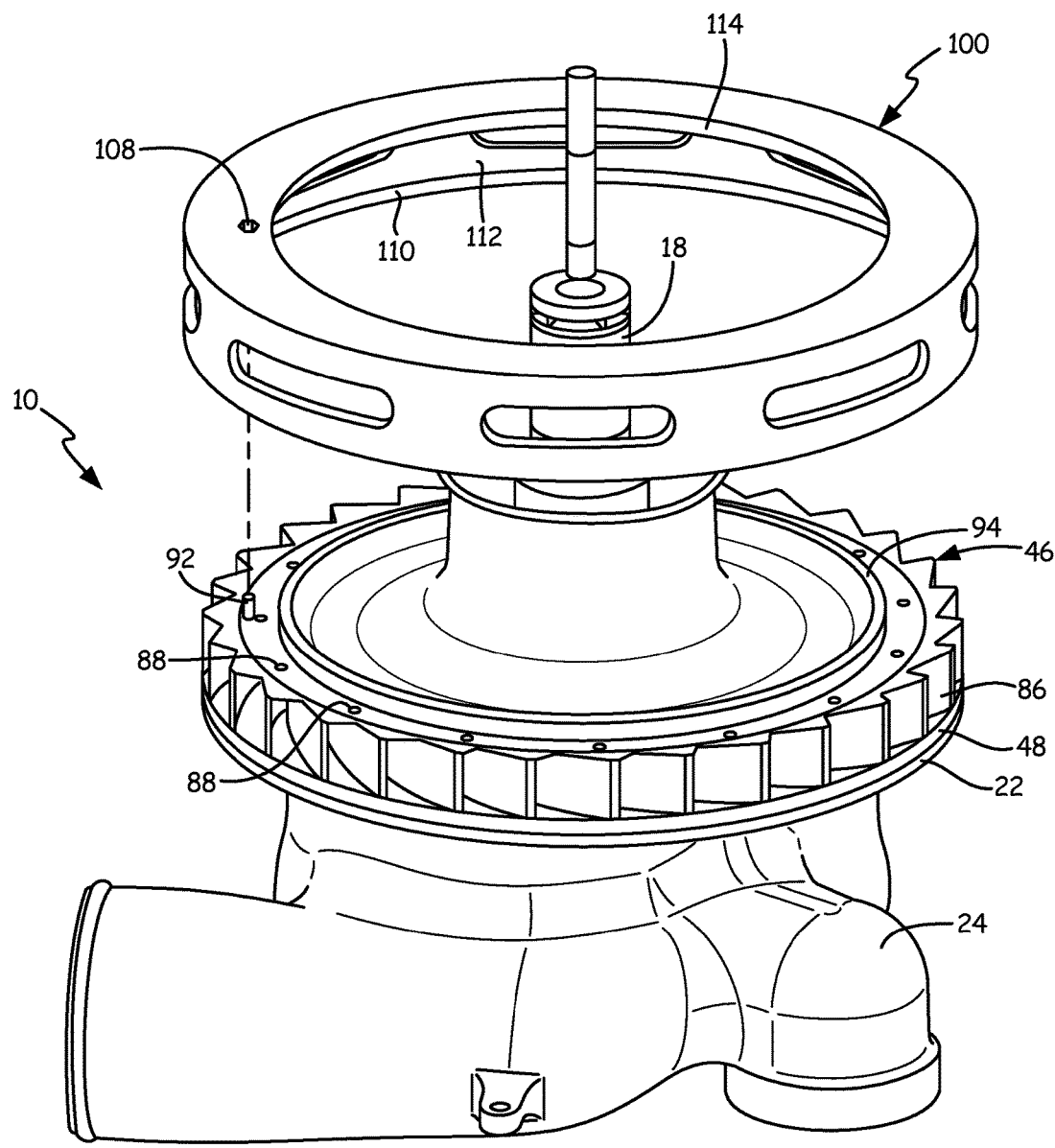
FIG. 4A is a perspective view of the alignment tool being used to install the diffuser in the air cycle machine.
Figure 4B:
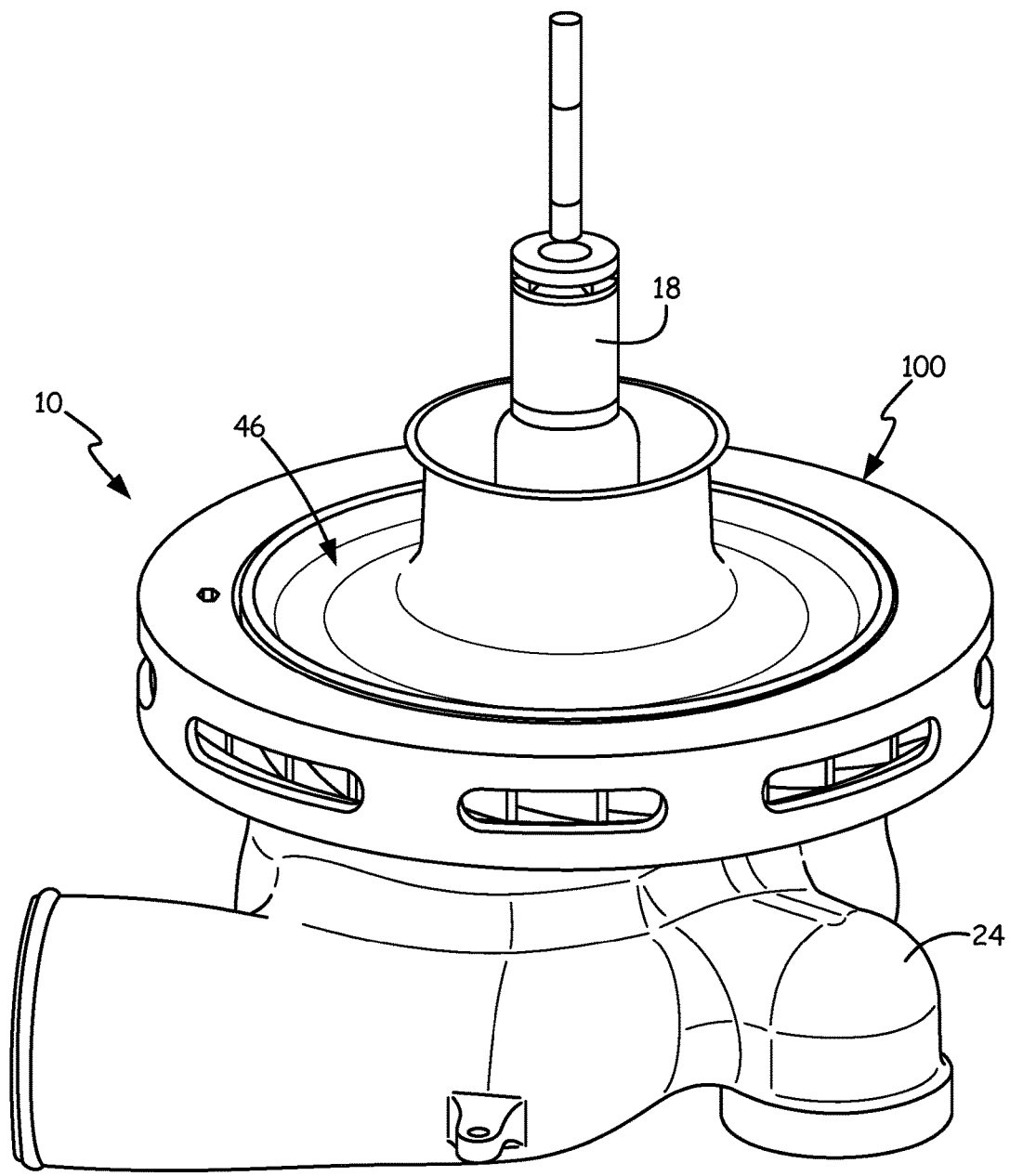
FIG. 4B is a perspective view of the alignment tool positioned over the diffuser in the air cycle machine.

FIG. 4A is a perspective view of alignment tool 100 being used to install diffuser 46 in air cycle machine 10. FIG. 4B is a perspective view of alignment tool 100 positioned over diffuser 46 in air cycle machine 10. Air cycle machine 10 includes shaft 18, compressor housing 20 (not shown in FIGS. 4A-4B), seal plate 22, first turbine inlet housing 24, compressor rotor 44 (not shown in FIGS. 4A-4B), diffuser 46, backing plate 48, and first journal bearing 70 (not shown in FIGS. 4A-4B). Diffuser 46 includes vanes 86, fastener apertures 88, timing pin 92, and mounting flange 94. FIGS. 4A-4B also show alignment tool 100, including pin aperture 108, first surface 110, second surface 112, and third surface 114.

Diffuser 46 is installed on air cycle machine 10 after a number of other components are assembled. First, first turbine inlet housing 24 and first journal bearing 70 are positioned on shaft 18. As seen in FIGS. 1A-1B, first journal bearing 70 is positioned between first turbine inlet housing 24 and shaft 18.

Next, seal plate 22 is placed on shaft 18 and positioned to abut first turbine inlet housing 24. Seal plate 22 and first turbine inlet housing 24 are pin matched prior to the assembly of air cycle machine 10. When seal plate 22 is positioned against first turbine inlet housing 24 during assembly of air cycle machine 10, seal plate 22 can be aligned with first turbine inlet housing 24 by aligning the pins. After seal plate 22 and first turbine inlet housing 24 are aligned, they are fastened together.

After seal plate 22 is installed, compressor rotor 44 is positioned on shaft 18. Compressor rotor 44 is rotatable with shaft 18 and is not fastened in place.

After compressor rotor 44 is installed, mounting plate 48 can be placed on shaft 18 and positioned to abut seal plate 22. Mounting plate 48 is positioned between seal plate 22 and diffuser 46 when air cycle machine 10 is fully assembled.

Next, diffuser 46 is placed on shaft 18 and over compressor rotor 44, and is positioned to abut backing plate 48 and seal plate 22. Diffuser 46 includes timing pin 92 that extends axially forward and axially backward from diffuser 46. When diffuser 46 is placed on shaft 18, a first end of timing pin 92 can extend into a pin aperture in seal plate 22 to line up fastener apertures 88 in diffuser 46 with fasteners apertures in seal plate 22. The second end of timing pin 92 will extend axially outward from diffuser 46. To properly align diffuser 46 in air cycle machine 10, alignment tool 100 can be placed over and around diffuser 46.

As seen in FIG. 4A, alignment tool 100 is positioned so that pin aperture 108 in alignment tool 100 is placed over timing pin 92 of diffuser 46. When alignment tool 100 is positioned over diffuser 46, as seen in FIG. 4B, first surface 110 of alignment tool 100 will surround a radially outer surface of seal plate 22. This allows first surface 110 of alignment tool 100 to align seal plate 22 in air cycle machine 10. Second surface 112 of alignment tool 100 will surround vanes 86 of diffuser 46. Third surface 114 of alignment tool 100 will surround a radially outer surface of mounting flange 94 of diffuser 46. This allows third surface 114 of alignment tool 100 to align diffuser 46 in air cycle machine 10. Together, first surface 110 and third surface 114 of alignment tool 100 will bring seal plate 22 and diffuser 46 into alignment, respectively. The diameter of first surface 110 and third surface 114 of alignment tool 100 are precision manufactured so that they have substantially the same diameter as the radially outer surface of seal plate 22 and a diameter of the radially outer surface of mounting flange 94 of diffuser 46, respectively. Precision manufacturing can include machining processes or any other process that can repeatedly create a part with low tolerances and precise dimensions. Precisely manufacturing first surface 100 and third surface 114 of alignment tool 100 allows first surface 110 and third surface 114 of alignment tool 100 to form a tight fit with the radially outer surface of seal plate 22 and the radially outer surface of mounting flange 94 of diffuser 46, respectively. This will precisely align diffuser 46 with seal plate 22 in air cycle machine 10. When alignment tool 100 is positioned over diffuser 46 and seal plate 22, fasteners can be placed through two of fastener apertures 88 in diffuser 46 and two of the fastener apertures in seal plate 22 opposite from one another. This will hold diffuser 46 and seal plate 22 together. After diffuser 46 and seal plate 22 are aligned and fastened together, alignment tool 100 can be removed.

After alignment tool 100 is removed, compressor housing 20 can be placed on shaft 18 and over diffuser 46 and plate 22. A first flange on compressor housing 20 will be placed over the radially outer surface of seal plate 22. A second flange on compressor housing 20 will be placed over the radially outer surface of mounting flange 94 of diffuser 46 to abut diffuser 46. The first flange of compressor housing 20 is precision manufactured to closely match the diameter of the radially outer surface of seal plate 22. This allows compressor housing 20 to be precisely aligned with seal plate 22. The second flange of compressor housing 20 is also precision manufactured to closely match the diameter of the radially outer surface of mounting plate 94 of diffuser 46. This allows compressor housing 20 to be precisely aligned with diffuser 46. When compressor housing 20 is precisely aligned, it can be fastened to seal plate 22 and diffuser 46 with fasteners that extend through the remaining fastener apertures in seal plate 22, through the remaining fastener apertures 88 in diffuser 46, and into fastener apertures in the second flange of compressor housing 20.

Overall, alignment tool 100 is a cost-effective tool that can be used to align diffuser 46 in air cycle machine 10. First, using alignment tool 100 eliminates the need to pin match diffuser 46 and seal plate 22 prior to assembly of air cycle machine 10. This eliminates steps from the assembly process, making the assembly process quicker and more cost effective. Second, by eliminating the pinning process, there are no pins or other additional parts that need to be added to air cycle machine 10, reducing the complexity of air cycle machine 10. Third, using alignment tool 100 allows for greater tolerances when manufacturing diffuser 46. Diffuser 46 does not need to be precision manufactured to ensure that diffuser 46 will align with seal plate 22 and compressor housing 20. This reduces the cost of manufacturing diffuser 46 and makes diffuser 46 easier to produce.

Discussion of Possible Embodiments

The following are non-exclusive descriptions of possible embodiments of the present invention.

A method of installing a diffuser in an air cycle machine includes placing a first housing on a shaft; placing a seal plate on the shaft; placing a diffuser on the shaft; aligning the diffuser and the seal plate with an alignment tool, wherein the alignment tool has a first annular surface to align with a radially outer surface of the seal plate and a second annular surface to align with an annular flange on the diffuser; fastening the diffuser to the seal plate; and removing the alignment tool from the diffuser and the seal plate.

The method of the preceding paragraph can optionally include, additionally and/or alternatively, any one or more of the following features, configurations and/or additional components:

The method further includes aligning the seal plate and the first housing with pins; and fastening the seal plate to the first housing.

The method further includes positioning a rotor on the shaft between the seal plate and the diffuser.

The method further includes placing a second housing on the shaft and over the diffuser and the seal plate; aligning a first flange on the second housing to a radially outer surface of the seal plate; aligning a second flange on the second housing with a radially outer surface of a mounting flange on the diffuser; and fastening the second housing to the diffuser and the seal plate.

The method further includes placing a timing pin in the diffuser through a pin aperture in the seal plate to line up fastener apertures in the diffuser with fastener apertures in the seal plate.

A diameter of the first annular surface of the alignment tool is substantially equal to a diameter of the radially outer surface of the seal plate.

A diameter of the second annular surface of the alignment tool is substantially equal to a diameter of a radially outer surface of the mounting flange on the diffuser.

Fastening the diffuser to the seal plate includes placing two fasteners through two fastener apertures in the diffuser and two fastener apertures in the seal plate, wherein the two fasteners are positioned opposite of one another across the diffuser and the seal plate.

An alignment tool that can be used to install a diffuser in an air cycle machine includes a body with a cylindrical portion and an end portion, a first surface on a radially inner face of the cylindrical portion positioned axially away from the end portion, a second surface on the radially inner face of the cylindrical portion positioned adjacent to the end portion, and a third surface on a radially inner edge of the end portion.

The alignment tool of the preceding paragraph can optionally include, additionally and/or alternatively, any one or more of the following features, configurations and/or additional components:

The first surface has a larger diameter than the second surface.

The first surface is configured to have a diameter that is substantially equal to a diameter of a radially outer surface of a seal plate in the air cycle machine.

The third surface is configured to have a diameter that is substantially equal to a diameter of a radially outer surface of a flange on the diffuser in the air cycle machine.

The first surface and the third surface are precision manufactured.

The alignment tool further includes a plurality of openings in the cylindrical portion of the alignment tool.

The alignment tool further includes an aperture in the end portion of the alignment tool that is configured to receive a timing pin.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An alignment tool that can be used to install a diffuser in an air cycle machine, the alignment tool comprising:
    a body with a cylindrical portion and an end portion;
    a first surface on a radially inner face of the cylindrical portion positioned axially away from the end portion;
    a second surface on the radially inner face of the cylindrical portion positioned adjacent to the end portion, wherein the first surface has a larger diameter than the second surface; and
    a third surface on a radially inner edge of the end portion.

2. The alignment tool of claim 1, wherein the first surface is configured to surround a radially outer surface of a seal plate in the air cycle machine.

3. The alignment tool of claim 1, wherein the third surface is configured to surround a radially outer surface of a flange on the diffuser in the air cycle machine.

4. The alignment tool of claim 1, wherein the first surface and the third surface are precision manufactured.

5. The alignment tool of claim 1, and further comprising:
    a plurality of openings in the cylindrical portion of the alignment tool.

6. The alignment tool of claim 1, and further comprising:
    an aperture in the end portion of the alignment tool that is configured to receive a timing pin.

7. An alignment tool that can be used to install a diffuser in an air cycle machine, the alignment tool comprising:
    a body with a cylindrical portion and an end portion;
    a first surface on a radially inner face of the cylindrical portion positioned axially away from the end portion, wherein the first surface is configured to to surround a radially outer surface of a seal plate in the air cycle machine;
    a second surface on the radially inner face of the cylindrical portion positioned adjacent to the end portion, wherein the first surface has a larger diameter than the second surface; and
    a third surface on a radially inner edge of the end portion, wherein the third surface is configured to surround a radially outer surface of a flange on the diffuser in the air cycle machine.

8. The alignment tool of claim 7, wherein the second surface is configured to surround a plurality of vanes on the diffuser.

9. The alignment tool of claim 7, wherein the first surface and the third surface are precision manufactured.

10. The alignment tool of claim 7, and further comprising:
    a plurality of openings in the cylindrical portion of the alignment tool.

11. The alignment tool of claim 7, and further comprising:
    an aperture in the end portion of the alignment tool that is configured to receive a timing pin.

12. An alignment tool that can be used to install a diffuser in an air cycle machine, the alignment tool comprising:
    a body with a cylindrical portion and an end portion;
    a first surface on a radially inner face of the cylindrical portion positioned axially away from the end portion;
    a second surface on the radially inner face of the cylindrical portion positioned adjacent to the end portion, wherein the first surface has a larger diameter than the second surface;
    a third surface on a radially inner edge of the end portion; and
    an aperture in the end portion of the alignment tool that is configured to receive a timing pin of the diffuser.

13. The alignment tool of claim 12, wherein the first surface is configured to surround a radially outer surface of a seal plate in the air cycle machine.

14. The alignment tool of claim 12, wherein the third surface is configured to surround a radially outer surface of a flange on the diffuser in the air cycle machine.

15. The alignment tool of claim 12, wherein the first surface and the third surface are precision manufactured.

16. The alignment tool of claim 12, and further comprising:
 a plurality of openings in the cylindrical portion of the alignment tool.

\* \* \* \* \*